(12) United States Patent
Eickemeyer et al.

(10) Patent No.: US 10,078,514 B2
(45) Date of Patent: Sep. 18, 2018

(54) TECHNIQUES FOR DYNAMIC SEQUENTIAL INSTRUCTION PREFETCHING

(71) Applicant: INTERNATIONAL BUSINESS MACHINES CORPORATION, Armonk, NY (US)

(72) Inventors: Richard J. Eickemeyer, Rochester, MN (US); Sheldon B. Levenstein, Austin, TX (US); David S. Levitan, Austin, TX (US); Mauricio J. Serrano, Bronx, NY (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/151,609

(22) Filed: May 11, 2016

(65) Prior Publication Data
US 2017/0329608 A1    Nov. 16, 2017

(51) Int. Cl.
*G06F 12/08* (2016.01)
*G06F 9/30* (2018.01)
*G06F 12/0862* (2016.01)
*H04L 12/743* (2013.01)
*G06F 12/0875* (2016.01)

(52) U.S. Cl.
CPC ...... *G06F 9/30047* (2013.01); *G06F 12/0862* (2013.01); *G06F 12/0875* (2013.01); *H04L 45/7457* (2013.01); *G06F 2212/452* (2013.01); *G06F 2212/602* (2013.01)

(58) Field of Classification Search
CPC ............ G06F 9/30047; G06F 12/0862; G06F 12/0875; G06F 2212/452; G06F 2212/602; G06F 9/30; H04L 45/7457; H04L 12/743
USPC .................................................. 711/137, 133
See application file for complete search history.

(56) References Cited

U.S. PATENT DOCUMENTS

| 6,480,939 B2 | 11/2002 | Anderson et al. |
| 2006/0047915 A1* | 3/2006 | Janik ............... G06F 12/0862 711/137 |
| 2013/0042074 A1* | 2/2013 | Kadambi ........... G06F 12/0862 711/137 |

(Continued)

OTHER PUBLICATIONS

Jih-Kwon Peir, Bloom Filtering Cache Misses for Accurate Data Speculation and Prefetching,ICS '02 Proceedings of the 16th international conference on Supercomputing, pp. 189-198, ACM.

*Primary Examiner* — Pierre Miche Bataille
(74) *Attorney, Agent, or Firm* — Michael R. Long; Robert R. Williams

(57) ABSTRACT

A technique for operating a processor includes allocating an entry in a prefetch filter queue (PFQ) for a cache line address (CLA) in response to the CLA missing in an upper level instruction cache. In response to the CLA subsequently hitting in the upper level instruction cache, an associated prefetch value for the entry in the PFQ is updated. In response to the entry being aged-out of the PFQ, an entry in a backing array for the CLA and the associated prefetch value is allocated. In response to subsequently determining that prefetching is required for the CLA, the backing array is accessed to determine the associated prefetch value for the CLA. A cache line at the CLA and a number of sequential cache lines specified by the associated prefetch value in the backing array are then prefetched into the upper level instruction cache.

20 Claims, 8 Drawing Sheets

(56) References Cited

U.S. PATENT DOCUMENTS

| | | | |
|---|---|---|---|
| 2015/0026413 A1* | 1/2015 | Meier | G06F 12/0862 711/137 |
| 2015/0212943 A1* | 7/2015 | Yang | G06F 12/0862 711/137 |
| 2015/0234745 A1* | 8/2015 | Roy | G06F 12/0862 711/125 |
| 2017/0315932 A1* | 11/2017 | Moyer | G06F 12/123 |

* cited by examiner

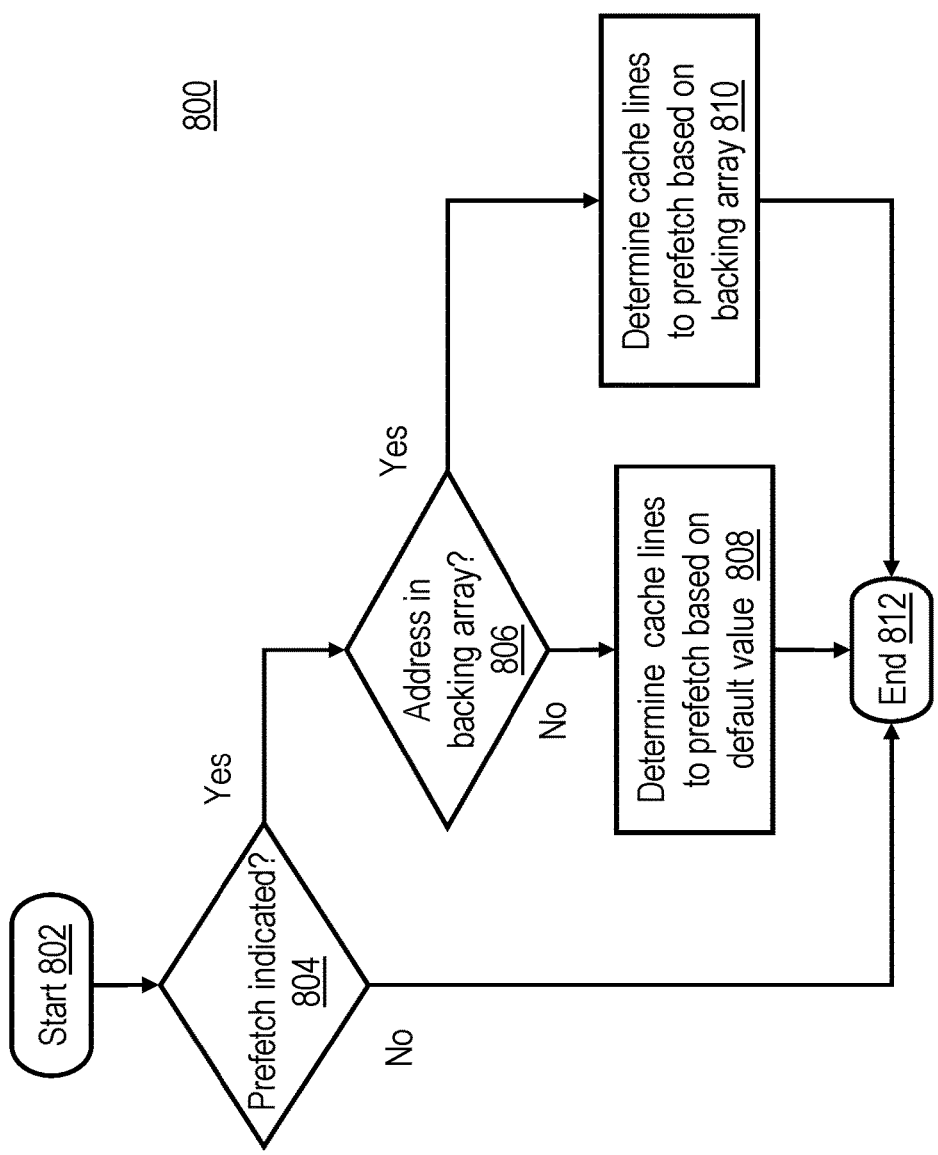

TECHNIQUES FOR DYNAMIC SEQUENTIAL INSTRUCTION PREFETCHING

BACKGROUND

The present disclosure is generally directed to instruction prefetching and, more specifically, to techniques for dynamic sequential instruction prefetching in a data processing system.

In general, a processor is much faster than main memory that stores programs and, as such, main memory may not be able source program instructions fast enough to keep the processor busy. Incorporating a cache memory (cache) within a data processing system has been used to provide faster processor access to program instructions. As is known, a cache is physically located closer to a processor than main memory and is usually faster than main memory. In computer architecture, instruction prefetching is also used by processors to speed-up program execution by reducing processor wait states. Instruction prefetching occurs when a processor requests that an instruction from lower level memory (e.g., main memory) be loaded into cache before the instruction is actually needed. With instruction prefetching, an instruction can be accessed more quickly from cache than if a processor had to request the instruction from main memory when actually needed, thus preventing a processor stall while awaiting receipt of the instruction from main memory.

Sequential prefetching refers to a cache requesting a number of sequential cache lines from lower level memory when one or more instructions at a particular location are anticipated to be executed. For example, a sequential prefetcher may statically prefetch two additional cache lines when a given cache line is prefetched. As one example, if a cache line at address 'N' is prefetched, cache lines at addresses 'N+1' and 'N+2' would also be prefetched by a sequential prefetcher that statically prefetches two additional cache lines. Unfortunately, sequentially prefetching additional cache lines statically may result in cache pollution due to the additional cache lines not being utilized prior to ejection from the cache. Sequentially prefetching too many instruction cache lines may also reduce processor performance by causing thrashing in an instruction cache. Moreover, sequentially prefetching too few instruction cache lines may also reduce processor performance due to latency in executing instructions.

BRIEF SUMMARY

A technique for operating a processor includes allocating an entry in a prefetch filter queue for a cache line address in response to the cache line address missing in an upper level instruction cache. In response to the cache line address subsequently hitting in the upper level instruction cache, an associated prefetch value for the entry in the prefetch filter queue is updated. The associated prefetch value corresponds to a number of entries in the prefetch filter queue that have cache line addresses that are sequential to the cache line address. In response to the entry being aged-out of the prefetch filter queue, an entry in a backing array for the cache line address and the associated prefetch value is allocated. In response to subsequently determining that prefetching is required for the cache line address, the backing array is accessed to determine the associated prefetch value for the cache line address. A cache line at the cache line address and a number of sequential cache lines that follow the cache line address, as specified by the associated prefetch value in the backing array, are then prefetched into the upper level instruction cache.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 8 is a flowchart of an exemplary process implemented by control logic associated with a backing array, configured according to one embodiment of the present disclosure.

DETAILED DESCRIPTION

Figure 1:
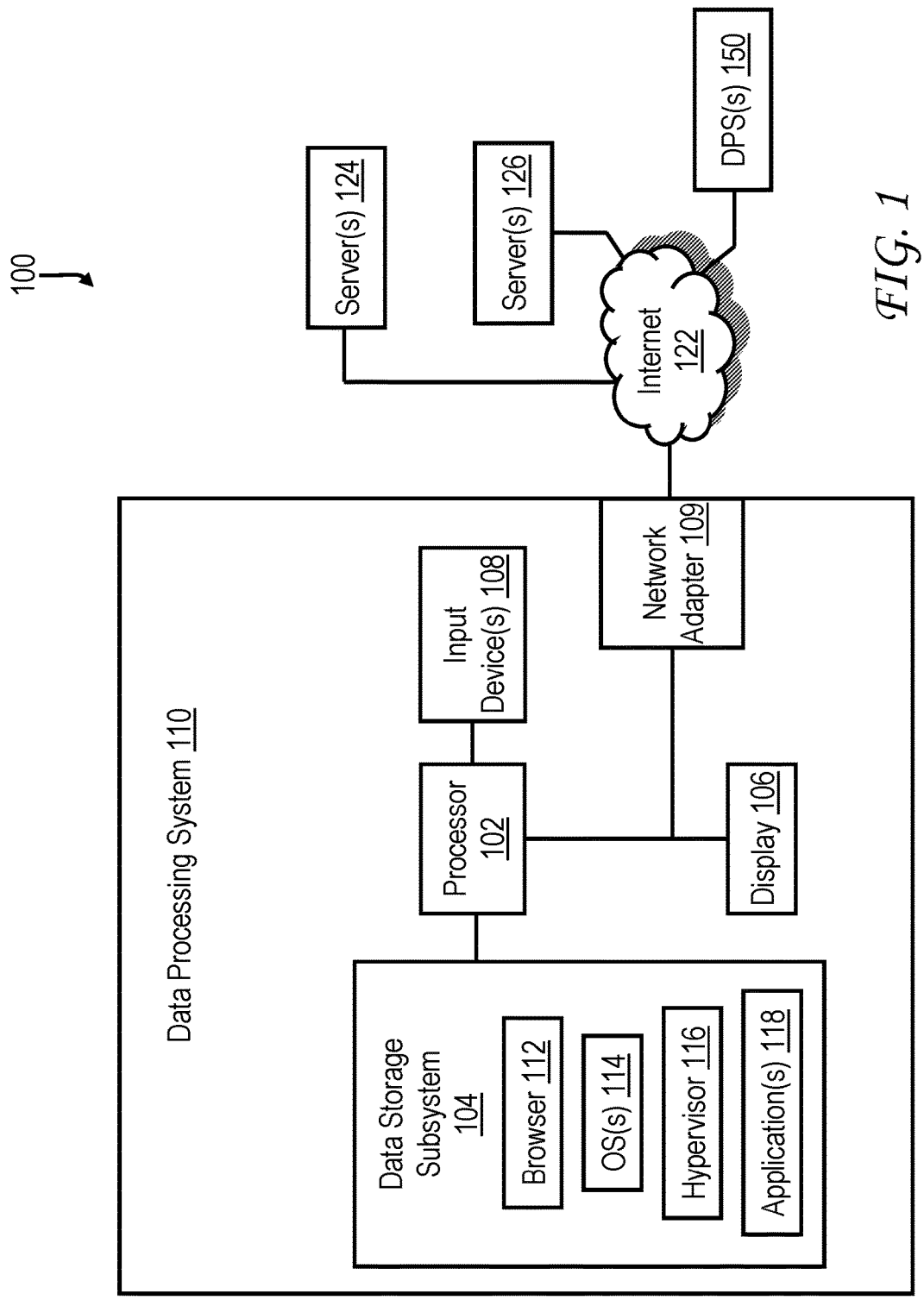
FIG. 1 is a diagram of a relevant portion of an exemplary data processing system environment that includes a simultaneous multithreading (SMT) data processing system that is configured to implement dynamic sequential instruction prefetching according to the present disclosure.

The illustrative embodiments provide a method, a data processing system, and a processor configured to implement dynamic sequential instruction prefetching.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements.

According to various embodiments of the present disclosure, two additional logic blocks are implemented within a data processing system to more accurately facilitate dynamically determining how many sequential instruction cache lines to prefetch in order to improve performance of the data processing system. A first logic block implements a relatively small prefetch filter queue (e.g., a first-in first-out (FIFO) content-addressable memory (CAM)) that tracks the last 'n' L1 instruction cache misses, e.g., 'n' may range from sixteen to thirty-two. As is known, a CAM is a special type of computer memory used in high-speed search applications that compares input search information against stored information in parallel and indicates matching information, for example, in one processor clock cycle. According to the present disclosure, each time a demand L1 instruction cache miss is issued, a new entry is created in the prefetch filter queue.

A second logic block, which is coupled to the first logic block, implements a backing array. In one or more embodiments, each time there is a demand request to an associated level (L2) cache a new prefetch filter queue is created and information associated with an older prefetch filter queue is aged-out to the backing array. When the prefetch filter queue is full, information associated with an oldest entry in the prefetch filter queue is aged-out to the backing array (e.g., the backing array may have 4096 entries). In general, the prefetch filter queue is full after the first 'n' L1 instruction cache misses, where 'n' corresponds to the number of entries in the prefetch filter queue. It should be appreciated that sizes of a prefetch filter queue and a backing array configured according to the present disclosure may vary above or below the sizes set forth herein. According to one or more embodiments, an address (or portion of an address) of each instruction that hits in the L1 cache is compared (e.g., in parallel for speed) against each entry in the prefetch filter queue. In one embodiment, when an address of an instruction that hit in the L1 cache matches an address of any of the next seven instructions after any of the entries in the prefetch filter queue then a matching bit is set for the entry.

According to an embodiment of the present disclosure, an instruction fetch address (IFA) generation unit is implemented to generate instruction fetch addresses. In one or more embodiments, the IFA generation unit translates effective addresses (EAs) used by programs to real addresses (RAs) used by hardware. The RAs are provided from the IFA generation unit to a level one (L1) instruction cache (L1 cache) that includes a directory, an array for storing instructions, and cache miss generation logic. The cache miss generation logic, among other functions, generates an instruction demand fetch when a generated RA (e.g., stored in an instruction fetch address register (IFAR), not shown) does not hit an RA in the directory of the L1 cache. The RAs are also provided from the IFA generation unit to a prefetch filter queue that is configured, according to the present disclosure and discussed in additional detail below, to store new entries for RAs that miss in the L1 cache and to (eventually) reflect a number of additional cache lines that should be prefetched for RAs that subsequently hit in the L1 cache.

The L1 cache is also coupled to an instruction demand and prefetch interface (that is coupled to an L2 cache, which is coupled to a lower level memory such as main memory), a sequential prefetch engine that is configured to check whether cache lines that are to be prefetched are currently in the L1 cache, the prefetch filter queue, and a backing array, which is coupled to the prefetch filter queue. When an entry is aged out of the prefetch filter queue information (including an address (or portion of the address) and a number of additional cache lines to prefetch) associated with the entry is stored in an entry in the backing array. The sequential prefetch engine is also coupled to the backing array and is configured to access the backing array to determine whether a cache line that requires prefetching (but is not currently in the L1 cache) has an associated entry in the backing array that specifies a number of additional cache lines that should be prefetched.

The sequential prefetch engine is also coupled to the L2 cache, which is coupled to the L1 cache. The L2 cache sources cache lines (which may be requested from a lower level cache or main memory) to the L1 cache on demand and based on a prefetch request. In one or more embodiments, the sequential prefetch engine is configured to prefetch up to seven additional sequential cache lines. As is discussed in further detail below, the number of sequential cache lines to prefetch is initially indicated by a 'prefetch lines' field in the prefetch filter queue, which is configured to improve instruction prefetching by reducing unnecessary prefetching. A size of the backing array determines how large an instruction footprint can be predicted. In general, implementing a relatively small (e.g., 16-32 entry) FIFO CAM for the prefetch filter queue in conjunction with a relatively large (e.g., 4096 entry) backing array results in a desirable design, as additional logic footprint required for the FIFO CAM is minimized.

In one embodiment, the backing array includes 4096 entries that are addressed by a real address (RA) or one or more portions of the RA. Assuming 64-bit addressing (bits 0-63), with bit '0' corresponding to a most significant bit (MSB) and bit '63' corresponding to a least significant bit (LSB), an instruction cache line size of one-hundred twenty-eight (128) bytes, and thirty-two (32) 4-byte instructions per cache line, an instruction within a cache line is specified by RA bits 57:61 and individual instruction bytes are specified by RA bits 62:63. In at least one embodiment, a backing array is addressed using twelve address bits, e.g., RA bits 45:56, that specify one of 4096 cache lines. In one or more embodiments, a four bit hash (based on RA bits 39:42) and a two bit tag (based on RA bits 40:41) may be implemented to improve addressing performance and to better avoid aliasing. As previously mentioned, the prefetch filter queue may be implemented as a 16 to 32 (e.g., 24) entry FIFO CAM.

In one or more embodiments, for each instruction cache miss a new entry is allocated in the prefetch filter queue. When the prefetch filter queue is full, each subsequent instruction cache miss causes information associated with the oldest prefetch filter queue entry to be written to an entry in the backing array. In various embodiments, addresses of all of the prefetch filter queue entries are compared against an address of each instruction that hits in the L1 cache. That is, for each instruction cache hit an RA (or a portion of the RA) of the instruction is compared against every prefetch filter queue entry in parallel. If the RA for the instruction that hit in the L1 cache matches an entry in the prefetch filter queue, the matching bit for the entry is set. When an oldest entry is aged out of the prefetch filter queue, a determination is made as to whether a match occurred for the entry and, if a match occurred, how many sequential instruction cache lines hit against the prefetch filter queue entry by examining a code that specifies an associated instruction prefetch length.

As one example, the code '000' indicates that no additional cache line prefetch is required for an associated address 'n', as there were no instruction fetch cache hits for the address 'n+1'. The code '001' indicates that a prefetch one cache line ahead (i.e., cache line 'n+1') is required for an associated address 'n', as there was an instruction fetch cache hit for the address 'n' and 'n+1'. The code '010' indicates that a prefetch two cache lines ahead (i.e., 'n+1' and 'n+2') is required for an associated address 'n'. The code '011' indicates that a prefetch three cache lines ahead (i.e., 'n+1', 'n+2', and 'n+3') is required for an associated address 'n'. The code '100' indicates that a prefetch four cache lines ahead (i.e., 'n+1', . . . , and 'n+4') is required for an associated address 'n'. The code '101' indicates that a prefetch five cache lines ahead (n+1', . . . , and 'n+5') is required for an associated address 'n'. The code '110' indicates that a prefetch six cache lines ahead hit (n+1, . . . , and n+6) is required for an associated address 'n'. Finally, the code '111' indicates that a prefetch seven cache lines ahead (i.e., n+1, . . . , and n+7) is required for an associated address 'n'.

When an entry is aged out of the prefetch filter queue information associated with the entry is stored in the backing array. By access the backing array, a determination can subsequently be made as to how many additional sequential instruction cache lines should be prefetched when the RA for the instruction is subsequently encountered and the RA has an associated entry in the backing array. In one embodiment, each backing array entry includes a one bit address tag (e.g., RA bit 44) and a three bit field for specifying the number of lines to prefetch (i.e., 0 to 7). In another embodiment, each backing array entry includes a two bit address tag (e.g., RA bits 43:44), and a two bit field for specifying the number of lines to prefetch (i.e., the three bit prefetch filter queue length field is modified to two bits or four encodes (e.g., 1, 3, 5, 7 instruction cache lines ahead)).

With reference to FIG. 1, an exemplary data processing environment 100 is illustrated that includes a simultaneous multithreading (SMT) data processing system 110 that is configured to implement dynamic sequential instruction prefetching. Data processing system 110 may take various forms, such as workstations, laptop computer systems, notebook computer systems, desktop computer systems or servers and/or clusters thereof. Data processing system 110 includes one or more processors 102 (which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
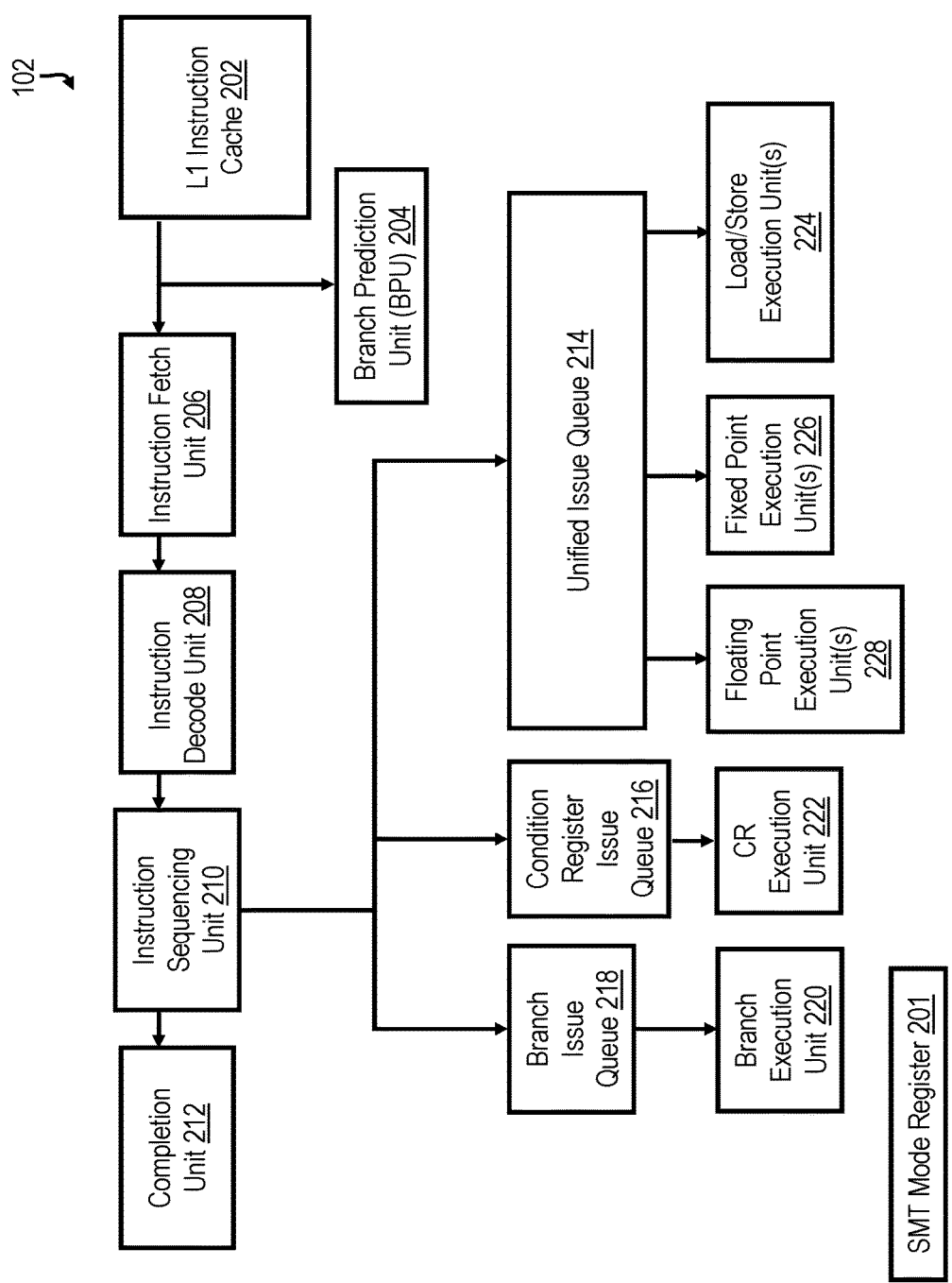
FIG. 2 is a diagram of a relevant portion of an exemplary processor pipeline of the data processing system of FIG. 1.

With reference to FIG. 2, relevant components of processor 102 are illustrated in additional detail. Processor 102 includes a level one (L1) instruction cache 202 from which instruction fetch unit (IFU) 206 fetches instructions. In one or more embodiments, IFU 206 may support a multi-cycle (e.g., three-cycle) branch scan loop to facilitate scanning a fetched instruction group for branch instructions predicted 'taken', computing targets of the predicted 'taken' branches, and determining if a branch instruction is an unconditional branch or a 'taken' branch. Fetched instructions are also provided to branch prediction unit (BPU) 204, which predicts whether a branch is 'taken' or 'not taken' and a target of predicted 'taken' branches.

In one or more embodiments, BPU 204 includes a branch direction predictor that implements a local branch history table (LBHT) array, global branch history table (GBHT) array, and a global selection (GSEL) array. The LBHT, GBHT, and GSEL arrays (not shown) provide branch direction predictions for all instructions in a fetch group (that may include up to eight instructions). The LBHT, GBHT, and GSEL arrays are shared by all threads. The LBHT array may be directly indexed by bits (e.g., ten bits) from an instruction fetch address provided by an instruction fetch address register (IFAR). The GBHT and GSEL arrays may be indexed by the instruction fetch address hashed with a global history vector (GHV) (e.g., a 21-bit GHV reduced down to eleven bits, which provides one bit per allowed thread). The value in the GSEL array may be employed to select between the LBHT and GBHT arrays for the direction of the prediction of each individual branch. BPU 204 may also be configured to predict a target of an indirect branch whose target is correlated with a target of a previous instance of the branch utilizing a pattern cache.

IFU 206 provides fetched instructions to instruction decode unit (IDU) 208 for decoding. IDU 208 provides decoded instructions to instruction sequencing unit (ISU) 210 for dispatch. In one or more embodiments, ISU 210 is configured to dispatch instructions to various issue queues, rename registers in support of out-of-order execution, issue instructions from the various issues queues to the execution pipelines, complete executing instructions, and handle exception conditions. In various embodiments, ISU 210 is configured to dispatch instructions on a group basis. In a single thread (ST) mode, ISU 210 may dispatch a group of up to eight instructions per cycle. In simultaneous multi-thread (SMT) mode, ISU 210 may dispatch two groups per cycle from two different threads and each group can have up to four instructions. It should be appreciated that in various embodiments, all resources (e.g., renaming registers and various queue entries) must be available for the instructions in a group before the group can be dispatched. In one or more embodiments, an instruction group to be dispatched can have at most two branch and six non-branch instructions from the same thread in ST mode. In one or more embodiments, if there is a second branch the second branch is the last instruction in the group. In SMT mode, each dispatch group can have at most one branch and three non-branch instructions.

In one or more embodiments, ISU 210 employs an instruction completion table (ICT) that tracks information for each of two-hundred fifty-six (256) input/output operations (IOPs). In one or more embodiments, flush generation for the core is handled by ISU 210. For example, speculative instructions may be flushed from an instruction pipeline due to branch misprediction, load/store out-of-order execution hazard detection, execution of a context synchronizing instruction, and exception conditions. ISU 210 assigns instruction tags (ITAGs) to manage the flow of instructions. In one or more embodiments, each ITAG has an associated valid bit that is cleared when an associated instruction completes. Instructions are issued speculatively, and hazards can occur, for example, when a fixed-point operation dependent on a load operation is issued before it is known that the load operation misses a data cache. On a mis-speculation, the instruction is rejected and re-issued a few cycles later.

Following execution of dispatched instructions, ISU 210 provides the results of the executed dispatched instructions to completion unit 212. Depending on the type of instruction, a dispatched instruction is provided to branch issue queue 218, condition register (CR) issue queue 216, or unified issue queue 214 for execution in an appropriate execution unit. Branch issue queue 218 stores dispatched branch instructions for branch execution unit 220. CR issue queue 216 stores dispatched CR instructions for CR execution unit 222. Unified issued queue 214 stores instructions for floating point execution unit(s) 228, fixed point execution unit(s) 226, load/store execution unit(s) 224, among other execution units. Processor 102 also includes an SMT mode register 201 whose bits may be modified by hardware or software (e.g., an operating system (OS)). It should be appreciated that units that are not necessary for an understanding of the present disclosure have been omitted for brevity and that described functionality may be located in a different unit.

Figure 3:
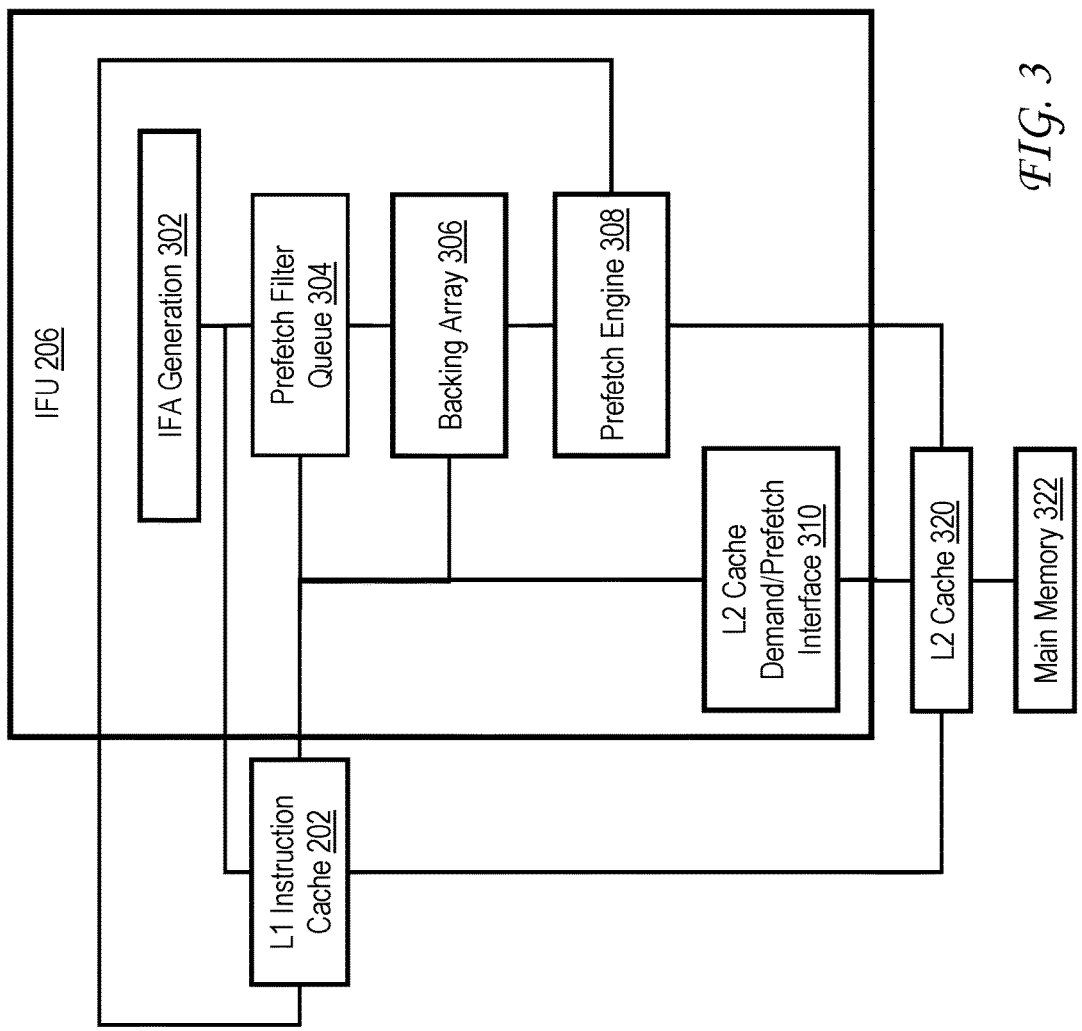
FIG. 3 is a diagram of a relevant portion of an exemplary instruction fetch unit (IFU) that is configured to implement dynamic sequential instruction prefetching according to the present disclosure.
Figure 4:
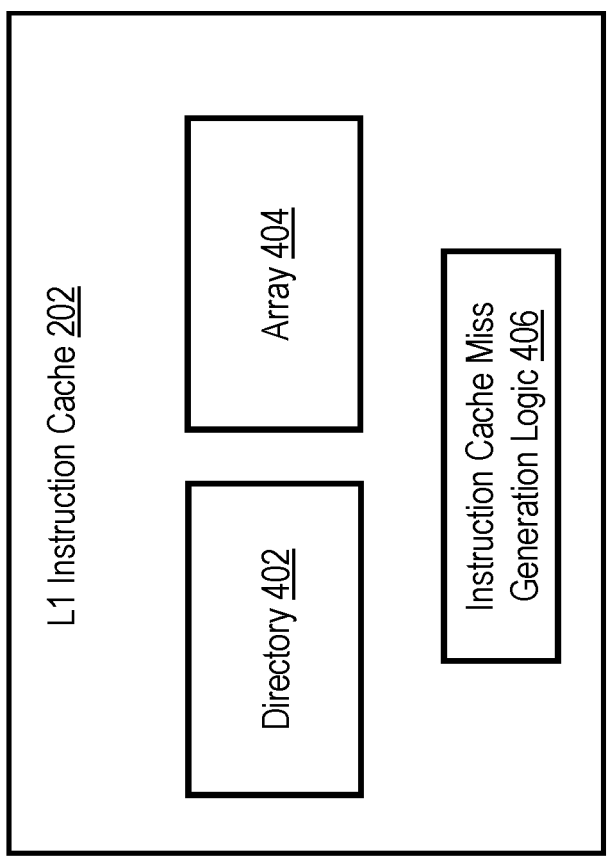
FIG. 4 is a diagram of a relevant portion of an exemplary level one (L1) instruction cache, configured according to an embodiment of the present disclosure.

With reference to FIG. 3, IFU 206 is further illustrated as including an instruction fetch address (IFA) generation unit 302, a prefetch filter queue 304, a backing array 306, a prefetch engine 308, and an L2 cache demand/prefetch interface 310. According to an embodiment of the present disclosure, IFA generation unit 302 is implemented to generate instruction fetch addresses. In one or more embodiments, IFA generation unit 302 translates effective addresses (EAs) used by programs to real addresses (RAs) used by hardware. The RAs are provided from IFA generation unit 302 to a level one (L1) instruction cache 202 that includes a directory 402, an array 404 for storing instructions, and instruction cache miss generation logic 406 (see FIG. 4). Logic 406, among other functions, generates an instruction demand fetch when a generated RA (e.g., stored in an instruction fetch address register (IFAR), not separately shown) does not hit an RA in directory 402 of L1 instruction cache 202. The RAs are also provided from IFA generation unit 302 to prefetch filter queue 304, which is configured to store new entries for RAs that miss in L1 instruction cache 202 and to (eventually) reflect a number of additional cache lines that should be prefetched for RAs that subsequently hit in L1 instruction cache 202.

L1 instruction cache 202 is also coupled to an L2 cache instruction demand and prefetch interface 310 (that is coupled to an L2 cache 320, which is coupled to a lower level memory such as main memory 322), a prefetch engine 308 that is configured to check whether cache lines that are to be prefetched are currently in L1 instruction cache 202, prefetch filter queue 304, and a backing array 306 (which is coupled to prefetch filter queue 304). When an entry is aged out of prefetch filter queue 304 information (including an address (or portion of the address) and a number of additional cache lines to prefetch) associated with the entry is stored in an entry in backing array 306. Prefetch engine 308 is also coupled to backing array 306 and is configured to access backing array 306 to determine whether a cache line that requires prefetching has an associated entry in backing array 306 that specifies a number of additional sequential cache lines that should be prefetched.

Prefetch engine 308 is also coupled to L2 cache 320, which is coupled to L1 instruction cache 202. L2 cache 320 sources cache lines (which may be requested from a lower level cache, or main memory 322) to L1 instruction cache 202 on demand and based on a prefetch request and stores cache lines ejected from L1 instruction cache 202. In one or more embodiments, prefetch engine 308 is configured to prefetch up to seven additional sequential cache lines that follow a cache line that is to be prefetched. As is discussed in further detail below, the number of sequential cache lines to prefetch for an entry is initially indicated by a 'prefetch lines' field in prefetch filter queue 304, which is configured to facilitate improved instruction prefetching by reducing unnecessary prefetching. A size of backing array 306 determines how large an instruction footprint can be predicted. In general, implementing a relatively small (e.g., 16-32 entry) FIFO CAM for prefetch filter queue 304 in conjunction with a relatively large (e.g., 4096 entry) backing array 306 results in a desirable design, as additional logic footprint required for the FIFO CAM is minimized.

In one embodiment, backing array 308 includes 4096 entries that are addressed by a real address (RA) or one or more portions of the RA. Assuming 64-bit addressing (bits 0-63), with bit '0' corresponding to a most significant bit (MSB) and bit '63' corresponding to a least significant bit (LSB), an instruction cache line size of one-hundred twenty-eight (128) bytes, and thirty-two (32) 4-byte instructions per cache line, an instruction within a cache line is specified by RA bits 57:61 and individual instruction bytes are specified by RA bits 62:63. In at least one embodiment, a backing array is addressed using twelve address bits that specify one of 4096 cache lines, e.g., RA bits 45:56. In one or more embodiments, a four bit hash (using RA bits 39:42) and a two bit tag (using RA bits 40:41) may be implemented to improve addressing performance and to better avoid aliasing. As previously mentioned, prefetch filter queue 304 may be implemented as a 16 to 32 (e.g., 24) entry first-in first-out (FIFO) CAM.

In one or more embodiments, for each L1 instruction cache 202 miss a new entry is allocated in prefetch filter queue 304, which causes the information associated with the oldest entry in prefetch filter queue 304 to be written to an entry in backing array 306 (assuming prefetch filter queue 304 is full). In various embodiments, addresses of all entries in prefetch filter queue 304 are compared against an address of each instruction that hits in L1 instruction cache 202. That is, for each hit in L1 instruction cache 202 an RA (or a portion of the RA) of the instruction is compared against every entry in prefetch filter queue 304 in parallel. If the RA for the instruction that hit in L1 instruction cache 202 matches an entry in prefetch filter queue 304, the matching bit for the entry is set. When an oldest entry is aged out of prefetch filter queue 304, a determination is made as to whether a match occurred for the entry and, if a match occurred, how many sequential instruction cache lines hit against the entry in prefetch filter queue 304 by examining a code that specifies an associated instruction prefetch length.

When an entry is aged out of prefetch filter queue 304 information associated with the entry is stored in backing array 306. By access backing array 306, a determination can subsequently be made as to how many additional sequential instruction cache lines should be prefetched when the RA for the instruction is subsequently encountered and the RA has an associated entry in backing array 306. In one embodiment, each entry in backing array 306 includes a one bit address tag (e.g., RA bit 44) and a three bit 'prefetch lines' field for specifying the number of additional lines to prefetch (i.e., 0 to 7). In another embodiment, each entry in backing array 306 includes a two bit address tag (e.g., RA bits 43:44), and a two bit 'prefetch lines' field for specifying the number of additional lines to prefetch (i.e., a three bit prefetch lines field of prefetch filter queue 304 length is modified to two bits or four encodes (e.g., 1, 3, 5, 7 instruction cache lines ahead)).

Figure 5:
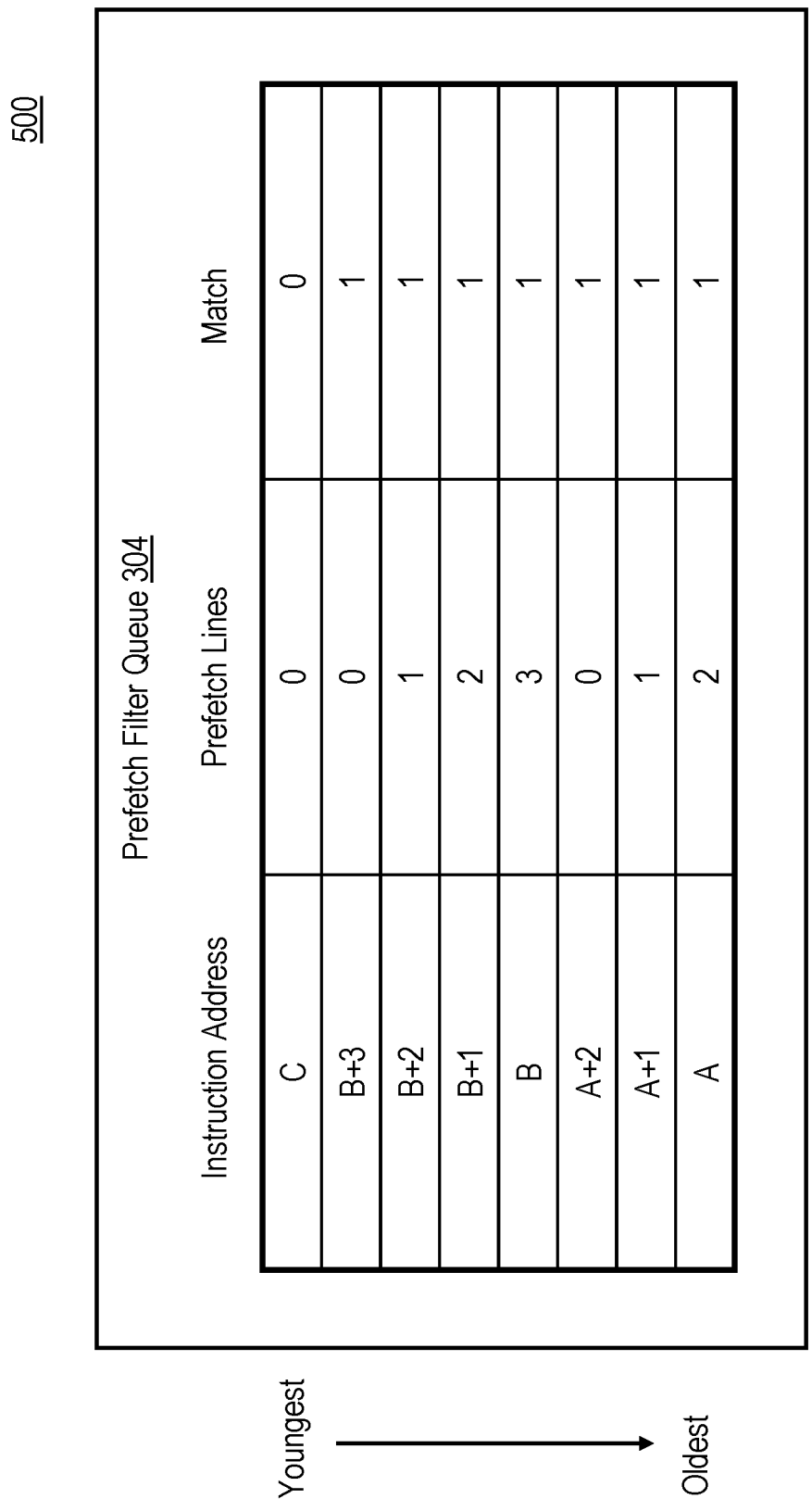
FIG. 5 is a diagram of a relevant portion of an exemplary prefetch filter queue, configured according to an embodiment of the present disclosure.

With reference to FIG. 5, a diagram 500 illustrates prefetch filter queue 304 as including eight populated entries. From oldest to youngest the populated entries include an entry for instruction cache lines having an address: 'A'; 'A+1'; 'A+3'; 'B'; 'B+1'; 'B+2'; 'B+3'; and 'C'. In one or more embodiments, a new entry is created in prefetch filter queue 304 when a miss occurs for an instruction in L1 instruction cache 202 and a 'prefetch lines' field for an entry is appropriately updated when a hit occurs for an instruction in L1 instruction cache 202. Accordingly, all of the entries except the last entry in prefetch filter queue 304 have had both an initial miss on an address for an instruction in L1 instruction cache 202 and a subsequent hit on the address for an instruction in L1 instruction cache 202 (as indicated by a match field value set equal to one (1)). More specifically, the instructions having addresses in cache lines 'A', 'A+1', 'A+2', 'B', 'B+1', 'B+2', and 'B+3' have subsequently hit in L1 instruction cache 202 (as indicated by a match field value of one (1)) and the instruction having the address 'C' has not subsequently hit in L1 instruction cache 202 (as indicated by a match field value of zero (0)).

Figure 6:
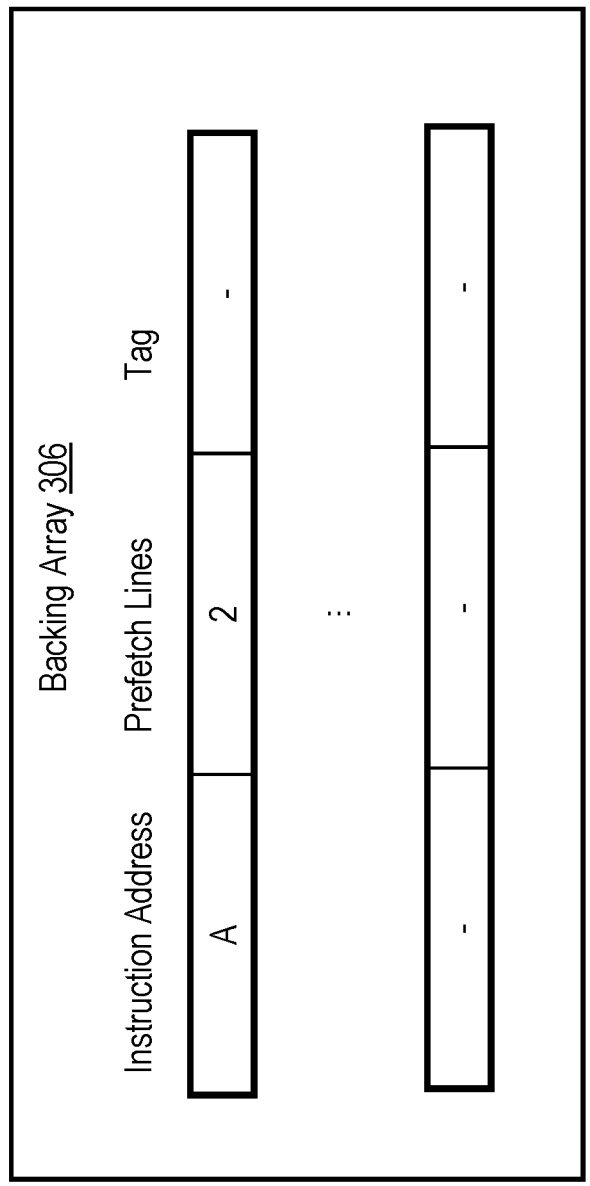
FIG. 6 is a diagram of a relevant portion of an exemplary backing array, configured according to an embodiment of the present disclosure.

As is illustrated in diagram 500 of FIG. 5, two additional cache lines should be prefetched for address 'A', one additional cache line should be prefetched for address 'A+1', and zero additional cache lines should be prefetched for address 'A+2'. According to diagram 500, three additional cache lines should be prefetched for address 'B', two additional cache lines should be prefetched for address 'B+1', one additional cache line should be prefetched for address 'B+2', and zero additional cache lines should be prefetched for address 'B+3'. With respect to address 'C', zero additional cache lines should be prefetched, according to diagram 500. With reference to FIG. 6, a diagram 600 illustrates that backing array 306 currently includes a single populated entry, i.e., an entry for address 'A', as address 'A' has been aged-out of prefetch filter queue 304 prior to the writing of a new entry. According to backing array 306, when address 'A' is to be prefetched two additional cache lines (i.e., cache lines 'A+1', and 'A+2), as indicated by a 'prefetched lines' field, should also be prefetched.

Figure 7:
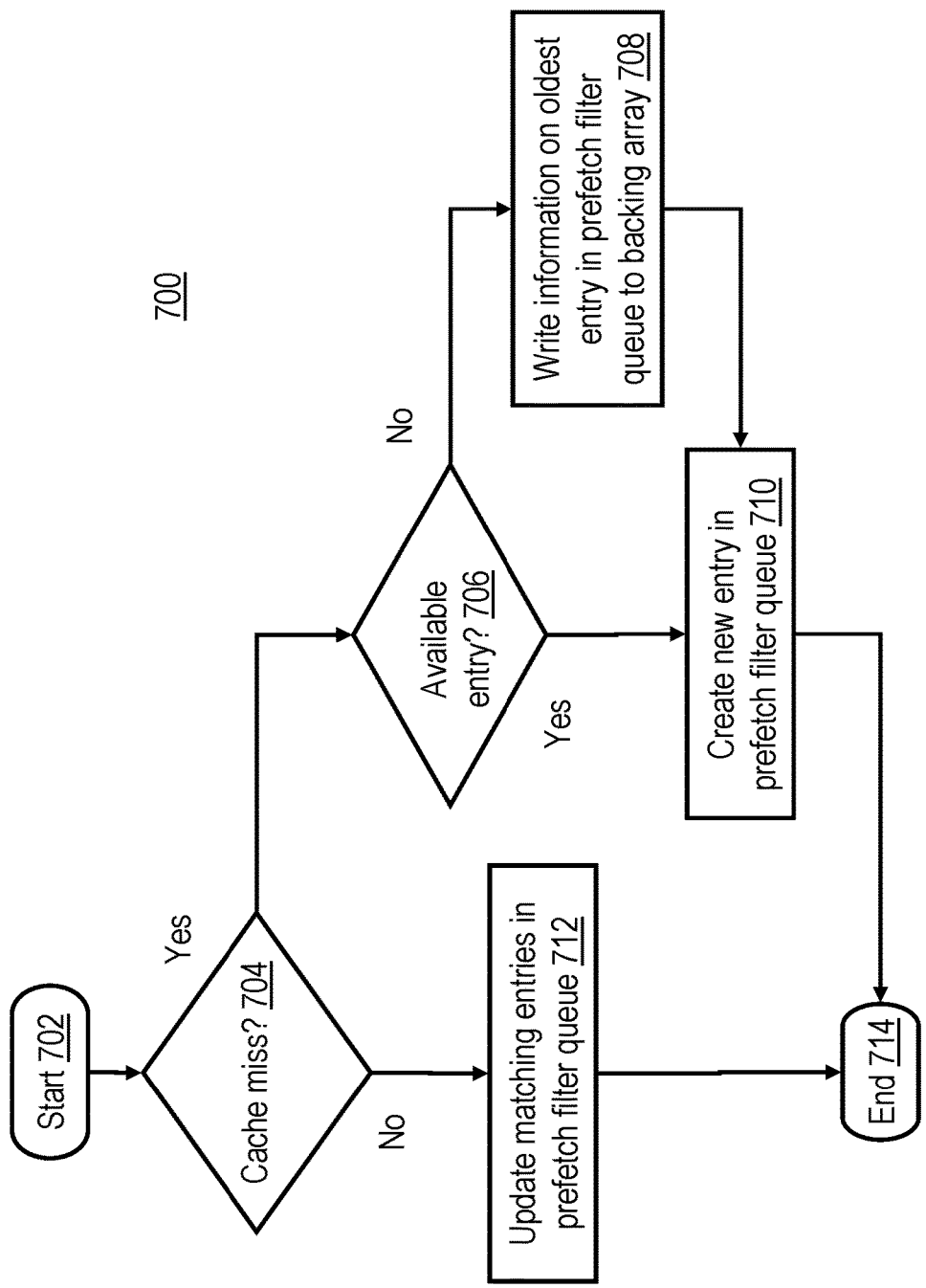
FIG. 7 is a flowchart of an exemplary process implemented by control logic associated with a prefetch filter queue, configured according to one embodiment of the present disclosure.

With reference to FIG. 7, an exemplary process 700 for updating prefetch filter queue 304, according to an embodiment of the present disclosure, is illustrated. Process 700 is initiated in block 702 in response to, for example, IFU 206 (more specifically, control logic of IFU 206) accessing L1 instruction cache 202. Next, in decision block 704, IFU 206 determines whether the access hit or missed in L1 instruction cache 202. In response to the access hitting in L1 instruction cache 202 in block 704 control transfers to block 712, where a 'prefetch lines' field of a matching entry (or entries), if any, in prefetch filter queue 304 is updated. From block 712 control transfers to block 714, where process 700 terminates. In response to the access missing in block 704 control transfers to decision block 706, where IFU 206 determines whether an entry is available in prefetch filter queue 304. In response to an entry being available (without requiring an oldest entry to be aged-out to backing array 306) in prefetch filter queue 304 control transfers to block 710. In block 710, IFU 206 creates a new entry for the address in prefetch filter queue 304. Following block 710 control transfers to block 714. In response to an entry not being available (without requiring an oldest entry to be aged out to backing array 306) in prefetch filter queue 304 control transfers to block 708. In block 708, IFU 206 writes information on an oldest entry in prefetch filter queue 304 to an entry in backing array 306. Following block 708 control transfers to block 710 and then to block 714.

With reference to FIG. 8, an exemplary process 800 for accessing backing array 306, according to an embodiment of the present disclosure, is illustrated. Process 800 is initiated in block 802 in response to, for example, IFU 206 periodically determining whether cache line prefetching should be performed for processor 102 to improve performance. For example, IFU 206 may determine whether to initiate instruction prefetching based on processor 102 stalls during a specific time period. Next, in decision block 804, IFU 206 (more specifically, control logic of IFU 206) determines whether instruction prefetching is indicated. In response prefetching not being indicated in block 804 control transfers to block 812, where process 800 terminates. In response prefetching being indicated in block 804 control transfers to decision block 806. In block 806, IFU 206 determines whether an address for which prefetching is desired has an associated entry in backing array 306. In response to backing array 306 including an entry for which prefetching is desired control transfers to block 810. In block 810, IFU 206 determines the number of cache lines to prefetch based on a value of the 'prefetch lines' field associated with the entry in backing array 306. From block 810 control transfers to block 812. In response to backing array 306 not including an entry for which prefetching is desired control transfers to block 808. In block 808, IFU 206 initiates cache line prefetching based on a default value of two. For example, using a default value of two for a cache line at address 'D' causes IFU 206 to initiate cache line prefetching of cache lines at address 'D', 'D+1', and 'D+2'. From block 808 control transfers to block 812.

Accordingly, techniques have been disclosed herein that advantageously improve sequential instruction prefetching by increasing the number of prefetched sequential instruction cache lines that are utilized.

In the flow charts above, the methods depicted in the figures may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of operating a processor, comprising:
   in response to a cache line address missing in an instruction cache, allocating, by an instruction fetch unit (IFU), an entry in a prefetch filter queue for the cache line address;
   in response to the cache line address hitting in the instruction cache subsequent to the cache line address missing in the instruction cache, updating, by the IFU, an associated prefetch value for the entry in the prefetch filter queue, wherein the associated prefetch value corresponds to a number of entries in the prefetch filter queue that have cache line addresses that are sequential to the cache line address;
   in response to the entry being aged-out of the prefetch filter queue, allocating, by the IFU, an entry in a backing array for the cache line address and the associated prefetch value;
   in response to determining that prefetching is required for the cache line address subsequent to the entry being aged-out of the prefetch filter queue, accessing, by the IFU, the backing array to determine the associated prefetch value for the cache line address; and
   in response to the backing array including the entry for the cache line address subsequent to the entry being aged-out of the prefetch filter queue, prefetching, by the IFU, a cache line at the cache line address and a number of sequential cache lines that follow the cache line address, as specified by the associated prefetch value in the backing array, into the instruction cache.

2. The method of claim 1, further comprising:
   in response to the backing array not including the entry for the cache line address, prefetching, by the IFU, a cache line at the cache line address and a default number of sequential cache lines that follow the cache line address into the instruction cache.

3. The method of claim 1, wherein the instruction cache is a level one (L1) instruction cache.

4. The method of claim 1, wherein the prefetch filter queue is implemented as a content-addressable memory (CAM).

5. The method of claim 4, wherein the prefetch filter queue is implemented as a first-in first-out (FIFO) CAM.

6. The method of claim 1, wherein the associated prefetch value ranges from zero to seven.

7. The method of claim 6, wherein the associated prefetch value is an odd integer.

8. A processor, comprising:
   a level one (L1) instruction cache; and
   an instruction fetch unit including a prefetch filter queue and a backing array, wherein the instruction fetch unit is coupled to the L1 instruction cache and is configured to:
      in response to a cache line address missing in the L1 instruction cache, allocate an entry in the prefetch filter queue for the cache line address;
      in response to the cache line address hitting in the L1 instruction cache subsequent to the cache line address missing in the L1 instruction cache, update an associated prefetch value for the entry in the prefetch filter queue, wherein the associated prefetch value corresponds to a number of entries in the prefetch filter queue that have cache line addresses that are sequential to the cache line address;

in response to the entry being aged-out of the prefetch filter queue, allocate an entry in the backing array for the cache line address and the associated prefetch value;

in response to determining that prefetching is required for the cache line address subsequent to the entry being aged-out of the prefetch filter queue, access the backing array to determine the associated prefetch value for the cache line address; and in response to the backing array including the entry for the cache line address subsequent to the entry being aged-out of the prefetch filter queue, prefetch a cache line at the cache line address and a number of sequential cache lines that follow the cache line address, as specified by the associated prefetch value in the backing array, into the L1 instruction cache.

9. The processor of claim 8, wherein the instruction fetch unit is further configured to:

in response to the backing array not including the entry for the cache line address, prefetch a cache line at the cache line address and a default number of sequential cache lines that follow the cache line address into the L1 instruction cache.

10. The processor of claim 8, wherein the prefetch filter queue is implemented as a content-addressable memory (CAM).

11. The processor of claim 10, wherein the prefetch filter queue is implemented as a first-in first-out (FIFO) CAM.

12. The processor of claim 8, wherein the associated prefetch value ranges from zero to seven.

13. The processor of claim 12, wherein the associated prefetch value is an odd integer.

14. The processor of claim 8, wherein the associated prefetch value is encoded by two bits.

15. A data processing system, comprising:

a data storage subsystem; and a processor coupled to the data storage subsystem, wherein the processor is configured to:

in response to a cache line address missing in a level one (L1) instruction cache, allocate an entry in a prefetch filter queue for the cache line address;

in response to the cache line address hitting in the L1 instruction cache subsequent to the cache line address missing in the L1 instruction cache, update an associated prefetch value for the entry in the prefetch filter queue, wherein the associated prefetch value corresponds to a number of entries in the prefetch filter queue that have cache line addresses that are sequential to the cache line address;

in response to the entry being aged-out of the prefetch filter queue, allocate an entry in a backing array for the cache line address and the associated prefetch value;

in response to determining that prefetching is required for the cache line address subsequent to the entry being aged-out of the prefetch filter queue, access the backing array to determine the associated prefetch value for the cache line address; and in response to the backing array including the entry for the cache line address subsequent to the entry being aged-out of the prefetch filter queue, prefetch a cache line at the cache line address and a number of sequential cache lines that follow the cache line address, as specified by the associated prefetch value in the backing array, into the L1 instruction cache.

16. The data processing system of claim 15, wherein the processor is further configured to:

in response to the backing array not including the entry for the cache line address, prefetch a cache line at the cache line address and a default number of sequential cache lines that follow the cache line address into the L1 instruction cache.

17. The data processing system of claim 15, wherein the prefetch filter queue is implemented as a content-addressable memory (CAM).

18. The data processing system of claim 17, wherein the prefetch filter queue is implemented as a first-in first-out (FIFO) CAM.

19. The data processing system of claim 15, wherein the associated prefetch value is encoded by two bits.

20. The data processing system of claim 15, wherein the associated prefetch value is encoded by three bits.

* * * * *